United States Patent [19]

Williams

[11] Patent Number: 5,199,810

[45] Date of Patent: Apr. 6, 1993

[54] CLAMP FOR JOINING TWO SECTIONS OF COUNTERTOP

[76] Inventor: Luke B. Williams, 2525 Concession #2 West, Lynden, Ontario, Canada, L0R 1T0

[21] Appl. No.: 748,514

[22] Filed: Aug. 22, 1991

[51] Int. Cl.$^5$ .............................................. B25G 3/00
[52] U.S. Cl. ..................................... 403/13; 403/402; 403/407.1
[58] Field of Search ................. 403/401, 402, 407.1, 403/13

[56] References Cited

U.S. PATENT DOCUMENTS 2,565,065  8/1951  Chakeres ........................ 403/407.1
4,976,565  12/1990  Stefan ............................. 403/402 X

FOREIGN PATENT DOCUMENTS 367784  1/1923  Fed. Rep. of Germany ...... 403/402

Primary Examiner—Andrew V. Kundrat
Attorney, Agent, or Firm—Daryl W. Schnurr

[57] ABSTRACT

A butt clamp consists of two shoes slidably mounted within a sleeve. The shoes are joined by a bolt having a nut threaded onto one end thereof. Each shoe has suitable openings therein so that it can be affixed to a substrate of a section of countertop. The assembled clamp is used to join two sections of countertop where one shoe is affixed to one section and the other shoe is affixed to the other section. The sleeve aligns the two shoes and when the bolt and nut are tightened, the two shoes are pulled towards one another, thereby pulling the two sections towards one another until the two sections are joined. Additional clamps can be used on the same joint. Adhesive can be used in the joint if desired. When the clamps are used, the two sections of countertop can be joined in the field rather than at the manufacturing site. Presently after two sections of a countertop have been cut along a 45° angle, part of the substrate of each section is machined out by a LOCK-TITE machine. A quick-setting adhesive is applied to each edge to be joined and the machined portions are connected by a stud and two nuts adjoining two rectangular plates. The two sections are joined at the manufacturing site. With the present invention, the two sections can be joined at the installation site rather than at the manufacturing site. Also, the joint can be tighter and stronger than previous joints.

8 Claims, 3 Drawing Sheets

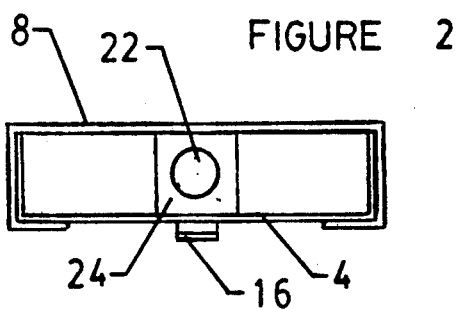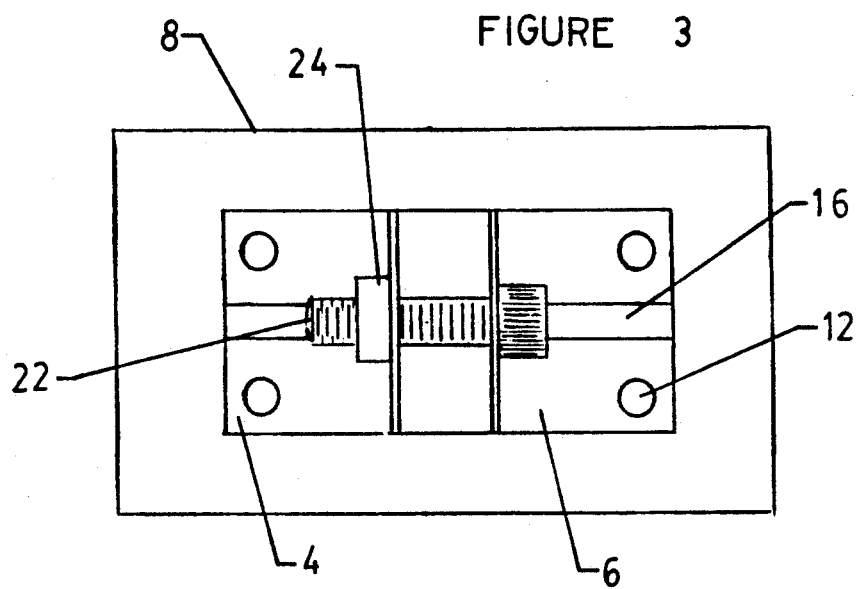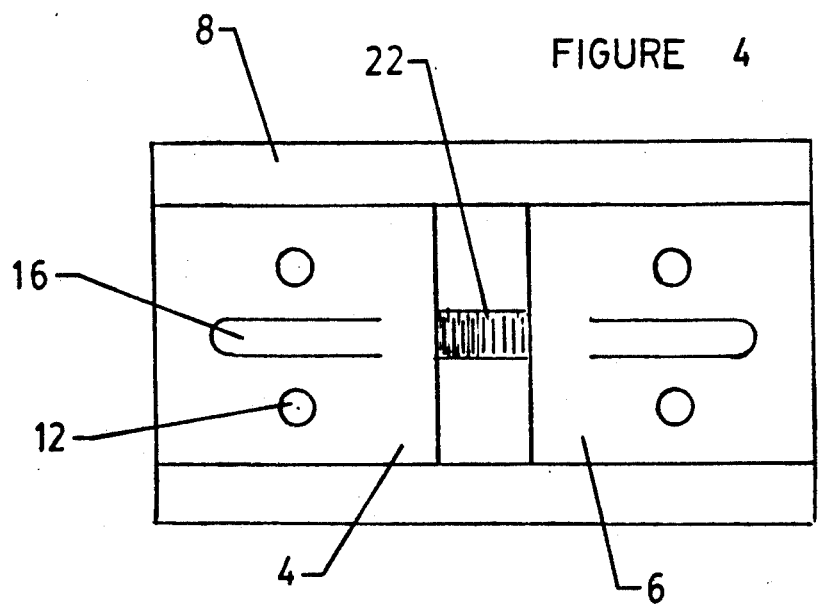

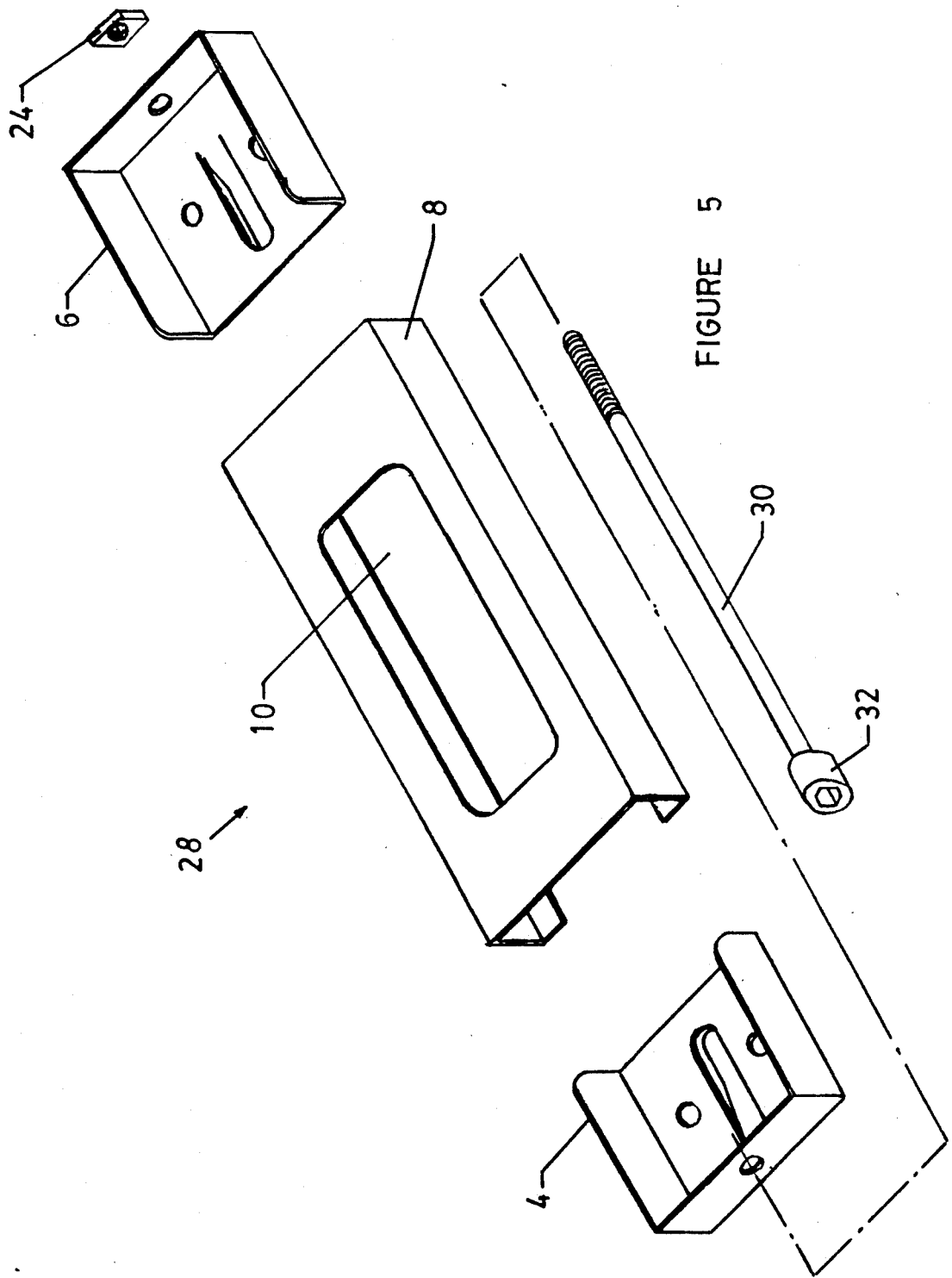

CLAMP FOR JOINING TWO SECTIONS OF COUNTERTOP

BACKGROUND OF THE INVENTION

1. Field of the Invention

This invention relates to a clamp for joining two sections of kitchen countertop and the like and, in particular, relates to a butt clamp and a method of use therefor whereby a kitchen countertop can be joined along a mitered edge.

2. Description of the Prior Art

It is known to join sections of countertop at corner miter joints by using a method that is often referred to as "LOCKTITE" (a trade mark). In using the LOCKTITE method, four keyhole-shaped slots are machined into the particle board substrate along each of the mating surfaces forming a joint. A quick setting cement or adhesive is applied to each surface and they are roughly aligned. Next, two small rectangular plates are connected by a stud and two nuts and are inserted into each keyhole astride the joint. The final alignment is made as the nuts are tightened. This operation requires skill and experience in order to obtain an acceptable result without damage to the joint. It is difficult to get the joint tight while simultaneously ensuring that an upper surface of the two sections is level. During the alignment process, the countertop is usually hammered or tapped to assist in the alignment. When working with a quick setting adhesive, the work must be completed quickly and efficiently. If it is not done properly, the two sections will not be aligned or the two sections can be damaged during the tapping and hammering. Also, when the keyhole-shaped slots are machined into the particle board substrate, there remains only a thin layer of countertop. When the countertop is installed at a site, the countertop can become damaged if too much force is exerted onto the top in the area of the joint. Due to the reduced thickness, the countertop is weaker at the joint than it is at other areas. Since the known method of joining two sections of countertop is difficult to accomplish and requires a great deal of expertise, the sections of countertop are joined at the manufacturing site using a LOCKTITE machine and fitting benches. The sections are not joined in the field. Once the two sections are joined, the countertop is extremely cumbersome and heavy and must be handled with extreme care to prevent damage. The countertop is then shifted to a site for installation purposes while the two sections remain joined together.

Before shipping, the countertop must be stored by the manufacturer. As the two sections are usually joined at right angles to one another, the resulting countertop is L-shaped and requires additional floor space for storage. Both sections cannot easily be covered with a protective covering as such a covering would be much too expensive.

Further, if a LOCKTITE joint leaks and water gets into the joint, as the thickness of the countertop is minimal, this can cause bumping to occur in the upper surface of the countertop. Further, as these countertops are generally used in kitchens, bathrooms, laundry rooms and the like of residential dwellings, if a countertop becomes damaged during transit or during installation, the installer requests a replacement countertop from the manufacturer on an urgent basis. To respond to this urgency, the manufacturer must delay its regular output.

SUMMARY OF THE INVENTION

It is an object of the present invention to provide a clamp whereby two sections of countertop can be joined either at the site of manufacture or at the site of installation, as desired. It is a further object of the present invention to provide a clamp where the sections can be joined at the site of manufacture and the joint can then be immediately reopened for storage, shipping and handling.

A butt clamp for use in joining two sections of countertop for use in kitchens and the like where each section has an upper surface and a substrate with a lower surface, the butt clamp has two shoes, longitudinal alignment means for said shoes and means for attaching one shoe to the substrate of one section of the countertop and means for attaching the other shoe to the substrate of the other section of countertop at a location for appropriately joining the two sections while the two shoes are aligned with one another. The shoes are slidable relative to said alignment means. There are means for forcing the shoes longitudinally closer to one another while maintaining the alignment of the shoes, thereby joining the two sections.

A method of joining two sections of countertop for use in kitchens and the like where each section has an upper surface and a substrate with a lower surface uses a butt clamp. The butt clamp has two shoes that have openings in a base thereof to receive wood screws for attaching the shoes to a substrate of each section, a sleeve to align the two shoes and a bolt extending through suitable openings in an end wall of each of the shoes with a nut located at one end of the bolt beyond the end wall. The method includes the steps of, while the shoes are located within the sleeve, affixing one of the shoes to the substrate near an edge to be joined, affixing the other shoe to the other section near an edge to be joined, rotating the nut and bolt relative to one another in an appropriate direction to cause the two shoes to move towards one another, tightening the nut and bolt until such time as the two sections are joined to one another, repeating the method with another butt clamp at a different location on the same joint.

BRIEF DESCRIPTION OF THE DRAWINGS

In the drawings:

FIG. 2 is a top view of the butt clamp of FIG. 1;

FIG. 3 is a bottom view of the butt clamp of FIG. 1;

FIG. 4 is an end view of the butt clamp of FIG. 1; and

FIG. 5 is an exploded perspective view of a butt clamp having shoes with end walls located at either end of the clamp.

DESCRIPTION OF A PREFERRED EMBODIMENT

Figure 1:
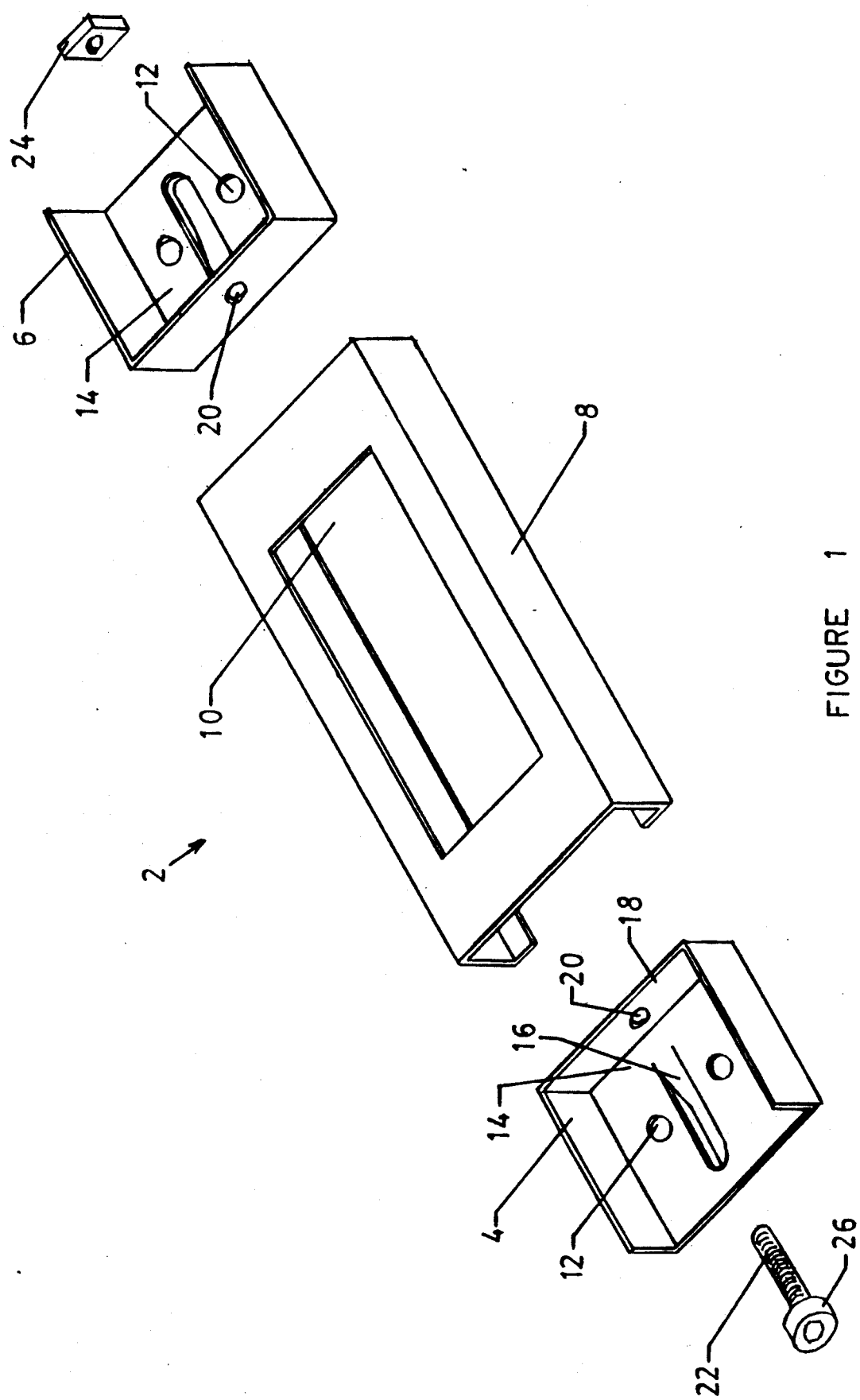
FIG. 1 is an exploded perspective view of one embodiment of a butt clamp.

In FIG. 1, it can be seen that a butt clamp 2 has two shoes 4, 6 with a sleeve 8 that provides longitudinal alignment means for said shoes 4, 6. The sleeve is sized to be slightly larger than the shoes so that it fits snugly over the shoes and the shoes are slidable relative to the sleeve. The sleeve 8 has an opening 10 therein to allow access to the shoes when the shoes are located within the sleeve. Each shoe 4, 6 has two circular openings 12 located in a base 14 by wood screws (not shown) for affixing the shoe to a substrate (not shown) of a countertop (not shown). A spring-like tongue 16 is formed into the base 14 so that the wood screws (not shown) will tighten when the tongue 16 contacts the substrate. If the screws are tightened further, the tongue 16 will be forced into the base 14. The purpose of the tongue 16 is to account for sections of countertop that have slightly different thicknesses. When this occurs, the wood screws in the shoe affixed to the substrate of the thicker section will be tightened further than the wood screws of the shoe affixed to the substrate of the thinner section. This will allow upper surfaces of the two sections to be flush with one another while lower surfaces of the two substrates are uneven.

Each shoe 4, 6 also contains an end wall containing an opening 20 for receiving a bolt 22. The bolt 22 extends through both openings 20 in each of the shoes 4, 6 and into a corresponding nut 24. When the bolt and nut are tightened relative to one another, the shoes will be drawn closer together. Preferably, the bolt 22 has a head 26 that is shaped to receive an ALLEN wrench.

In FIGS. 2, 3 and 4, the clamp 2 is shown in an assembled version and the same reference numerals have been used to identify the components in these figures that are identical to the components of FIG. 1. While one large opening 10 in the sleeve 8 is preferred, it would be possible to have as many as four openings 10, one above each of the circular openings 12 in the shoes 4, 6 to provide access to those screws and openings when the sleeve is in the assembled position shown in FIGS. 2, 3 and 4 relative to the shoes. Preferably the shoes will be affixed to the substrate when the clamp is assembled. When this is done the two shoes will be aligned with one another automatically by the sleeve. If extra precautions are taken to measure the exact required location of the shoes, it would be possible though it is not recommended to affix the shoes to the two substrates before sliding the sleeve over the shoes.

In FIG. 5, there is shown a butt clamp 28, which is almost identical to the clamp 2 except that the shoes 4, 6 are reversed in orientation so that the end walls 18 are located at opposite ends of the clamp 28 rather than adjacent to one another as they are with the clamp 2. This results in a bolt 30 being required that is much longer than the bolt 22 of the clamp 2. A head 32 of the bolt 30 and the nut 24 are accessible at either end of the clamp 28. With the clamp 2, the head 26 and the nut 24 are accessible through the opening 10.

The clamp of the present invention will be most often used at mitered corners of countertops for kitchens and the like. The assembled clamp is mounted on the substrates of the two sections by affixing the two shoes, one to each section, while the shoes are located in the sleeve. The shoes are affixed near the two edges that are being joined together. Preferably, the shoes will be approximately one-half an inch apart from one another before the nut and bolt are tightened. For example, if the shoes are affixed to the lower surface of the substrate approximately one-sixteenth to one-eighth of an inch back from the edge of that section that is intended to be joined to the edge of an adjacent section, the two sections will be one-quarter of an inch to three-eighths of an inch apart. The bolt and nut can then be tightened to draw the shoes closer together until the two edges of the countertop are joined. Preferably, for alignment purposes, the shoes are affixed to the two sections of countertop while they are located within the sleeve. The clamps can be mounted on a joint at the manufacturing site or in the field at the site of installation. If the clamps are mounted at the manufacturing site, the shoes are loosened so that the sleeve and bolt can be removed and the two sections are still shipped separately and finally joined together using the sleeve and the bolt and nut at the time of installation. In this way, the manufacturer can be assured that the joint is a good one.

In most instances, more than one clamp will be used for each joint. For example, in a standard countertop, a joint might require the use of three or four clamps. Once the two sections of countertop are cut along a 45° angle, no further cutting of the countertop or substrate is necessary. There is no change in the thickness of the substrate at the joint. Adhesive can be used in the joint at the time that it is being made in the field. The use of adhesive is conventional and is therefore not further discussed. When the joint is tested at the manufacturing site, no adhesive would be used as it would then be too difficult to separate the two sections. The use of the clamps also permits small changes to be made to the countertops at the installation site if there is difficulty in fitting the countertop onto a particular set of cupboards.

It has been found that the clamp of the present invention results in a tight joint that is stronger than the joints made with the LOCKTITE system. In addition, the clamp provides efficient alignment of upper surfaces. Further, an unskilled person can use the clamp to make a joint as good or better than a skilled person using a LOCKTITE.

What I claim as my invention:

1. A butt clamp for use in joining two sections of countertop for use in kitchens and the like, each section of countertop having an upper surface and a substrate with a lower surface, said clamp comprising two shoes, longitudinal alignment means for said shoes, means for attaching one shoe to the substrate of one section of the countertop and means for attaching the other shoe to the substrate of the other section of the countertop at a location for appropriately joining the two sections while the two shoes are aligned with one another, said shoes being slidable relative to said alignment means, means for forcing the shoes longitudinally closer to one another while maintaining said alignment, thereby joining the two sections of countertop.

2. A butt clamp as claimed in claim 1 wherein the alignment means is a sleeve having a C-shaped cross-section that is sized so that it fits snugly over both shoes, said sleeve being slidable relative to said shoes.

3. A butt clamp as claimed in claim 2 wherein the sleeve has at least one opening therein to allow access to the shoes so that the shoes can be affixed to the substrate when the shoes are located inside the sleeve.

4. A butt clamp as claimed in claim 3 wherein the means for attaching the shoes to the substrate are circular openings in the shoes that are each sized to receive a wood screw.

5. A butt clamp as claimed in claim 4 wherein each shoe has an end wall normal to a longitudinal axis of the shoes, each end wall containing an opening to receive a bolt, said bolt being long enough to extend through the openings in said end walls when the shoes are located apart from one another, a nut corresponding to said bolt so that when the nut and bolt are tightened, the shoes are forced longitudinally closer to one another.

6. A butt clamp as claimed in claim 5 wherein the shoes are identical to one another and have a spring-like tongue formed into a base surface that is located immediately adjacent to the substrate when the shoes are affixed to the substrate, said tongue causing the wood screws to tighten before the base contacts the substrate.

7. A method of joining two sections of countertop for use in kitchens and the like, each section having an upper surface and a substrate with a lower surface, said method using a butt clamp having two shoes that have openings in a base thereof to receive wood screws for attaching the screws to a substrate of each section, a sleeve to align the two shoes and a bolt extending through suitable openings in an end wall of each of the shoes with a nut located at one end of the bolt beyond the end wall, said method comprising the steps of inserting the shoes into the sleeve, inserting a bolt through the openings and a nut over a threaded end of the bolt while leaving the nut in an untightened position with the shoes well apart from one another, placing the butt clamp across two of sections of a countertop to be joined to one another, affixing one shoe through the substrate of one section of the countertop and affixing the other shoe to the substrate of the other section of the countertop while said shoes remain within said sleeve, rotating the nut relative to said bolt to cause the two shoes to move towards one another, thereby tightening the nut and bolt until such time as the two sections are joined to one another.

8. A method as claimed in claim 7 wherein adhesive is available for use in said joint, before the step of tightening the nut and bolt of each of the butt clamps, including the step of applying adhesive to the edges to be joined.

* * * * *